Dec. 13, 1938.   C. C. GRAVESEN   2,140,203
ADJUSTABLE DOOR HANDLE CONSTRUCTION
Filed April 4, 1938
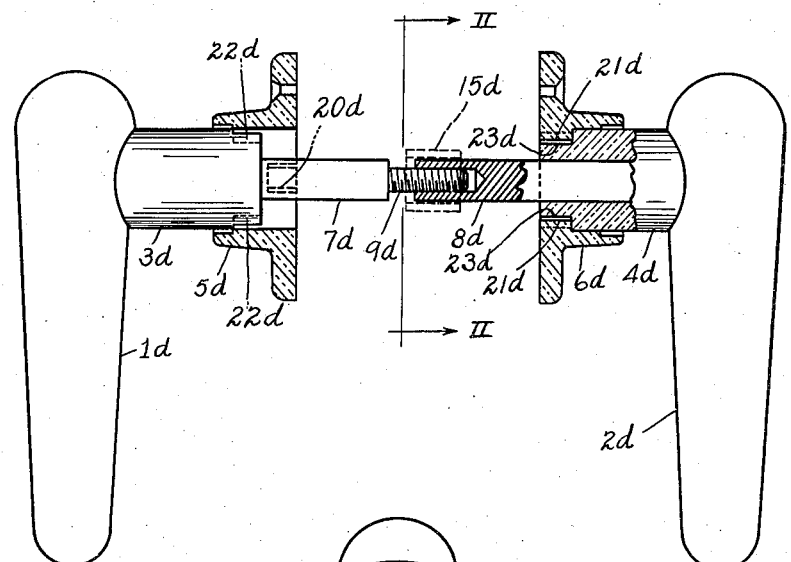
Fig. I.
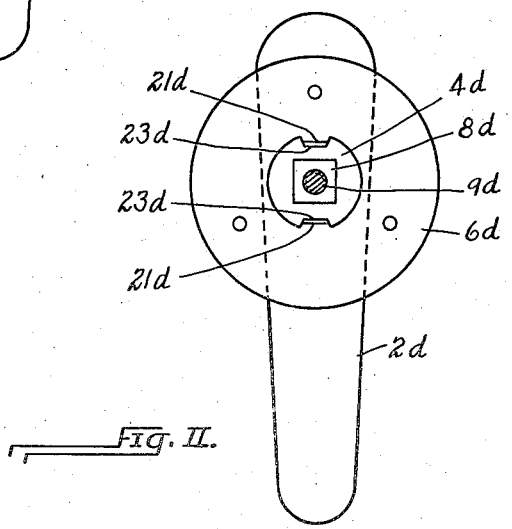
Fig. II.
INVENTOR.
Carl C. Gravesen
BY Christy and Wharton
ATTORNEYS.

Patented Dec. 13, 1938

2,140,203

UNITED STATES PATENT OFFICE 2,140,203

ADJUSTABLE DOOR HANDLE CONSTRUCTION

Carl Christian Gravesen, Roskilde, Denmark, assignor of one-half to Frederick W. Bradley, Pittsburgh, Pa.

Application April 4, 1938, Serial No. 199,827
In Denmark March 3, 1937

5 Claims. (Cl. 292—359)

The present invention relates to an adjustable door handle construction, having two handles and collars that are preferably made from pressed material, particularly artificial resins such as Bakelite.

The use of Bakelite as a construction material for door handles has led to a number of more or less complicated constructions, with the aim of making the door handles adjustable so that no axial play will occur at any visible part of the construction. This is difficult to do, because due to the inherent brittleness of Bakelite the parts cannot be hammered into positions to eliminate play between the parts. As mentioned above, the constructions of this kind hitherto employed have been complicated and expensive to manufacture, because in many cases the stem is rigidly connected to one of the handles, which necessitates the use of heavy securing means for attaching the other handle. In other cases complicated connections between two stem parts, each fixed to one of the handles, have been used.

The invention consists of an adjustable door handle construction, in which the handles advantageously though not necessarily are formed of pressed material, particularly Bakelite. In the preferred embodiment of the invention a stem part is fixed to each of the handles. Such stem parts are coupled together against axial displacement by suitable means, such as a screw connection.

In order that the invention may be more readily understood, reference will now be made to the accompanying drawing, in which Fig. I is a view in axial section of structure embodying the invention, and Fig. II is a view in cross-section of the structure, on the plane II—II of Fig. I.

Referring to the drawing, $1d$ and $2d$ are the door handles, each being provided with a cylindrical projection ($3d$ and $4d$ respectively) for centering collars $5d$ and $6d$. The the handle $1d$ a stem part $7d$ of square cross section is fixed, preferably by being embedded in the pressed or molded material of which the handle is made. To the other handle, $2d$, is fixed a stem part $8d$, in the end of which is formed an internally threaded bore. The stem part $7d$ carries at its projecting end an externally threaded pin $9d$ that engages in the threaded bore of stem part $8d$. The relative axial adjustment of the handles is effected by screwing the pin 9 into the threaded bore until both collars come into contact with the opposite surfaces of the door.

The collars are axially adjustable on the cylindrical parts $3d$ and $4d$ of the handles. Each of such collars $5d$ and $6d$ has in its bore two inward projections $20d$ and $21d$ respectively, adapted to be nested in grooves $22d$ and $23d$ respectively formed in the cylindrical bodies of the handle portions $3d$ and $4d$.

As already mentioned, the stem parts $7d$ and $8d$ are connected with each other by means of the screw connection $9d$, e. g. a threaded pin fixed to one of the stem parts and engaging a threaded bore in the other stem part. The rollback or lock tube or internally apertured element of the lock through which the stem $7d$, $8d$ is passed is indicated in dotted lines at $15d$. The mounting of the handle structure is carried out as follows:

The stem parts are separated by unscrewing the stem part $8d$ from engagement with pin $9d$, and the collar $6d$, rotated to bring its projections $21d$ into alignment with the grooves $23d$ in the cylinder portion $4d$, is drawn as far as possible toward the grip portion of the handle $2d$. (Note the positions of these parts illustrated in Fig. 1.) Then the two stem parts of the handle structure are projected inward from opposite sides of the door (not shown), and the inner ends of such stem parts are screwed together, with joint between the stem parts so positioned relatively to the tubular latch element $15d$ that one handle may be rotated relatively to the other, until, by screwing the pin $9d$ into the bore of stem part $8d$, the space between the handles is reduced to the value proper for the installation. Then the collar $6d$ is shifted toward the surface of the door (disengaging the projections $21d$ from the grooves $23d$), and rotated through approximately 90°, this adjustment of the collar being accompanied by, or preceded by, the axial shifting of the handle assembly into such position that the united ends of the stem parts lie within the tubular latch element $15d$. When the parts have been so adjusted, the collars $5d$ and $6d$ are secured (say by means of screw nails) to the door, with the projections $20d$ and $21d$ abutting endwise upon the inner ends of the handle portions $3d$ and $4d$ in the angular intervals between the grooves $22d$ and $23d$ severally formed in such handle portions. Thus the united ends of the stem parts are secured against axial movement within the tubular latch element $15d$. The opening in the tubular latch element is square in cross section, so that the engagement of such latch element with the square ends of the stem parts $7d$ and $8d$ prevents relative rotation of the interconnected parts. The rotation of either door handle is transmitted by means of element 15d to the movable parts of the lock or latch structure.

If, in the course of making such assembly, it is impossible to shift the collar 6d a sufficient interval to free the projections 21d from the grooves 23d, the effective length of the assembled stems (that is, the distance between the handles) must in increased. This is done, before the collars are secured in fixed positions, by rotating one handle relatively to the other, to withdraw the pin 9d a sufficient interval in its engagement with the bore in stem part 8d.

If, on the other hand, it be found that there is excessive axial play of the handles in the completed assembly, the collars 5d and 6d are freed, the collar 6d is restored to the position in which it is shown in Fig. I, the assembly is shifted to move the united ends of the stem parts from the latch element 15d, and the interval between the handles is decreased, by rotating one handle relatively to the other in proper direction of rotation. Then, the assembly is again completed. Usually perfect adjustment will be obtained in two tries. If not, the operation is repeated until the adjustment is perfected.

I have described the assembling operation, with the collar 6d as the collar which is shifted between alternate positions on its cylindrical handle portion (4d). Manifestly, the collar 5d, or both collars, may be actively employed in making the installation.

It will be noted that the structure of this invention has no screws or like fastening devices which are exposed in the handles, or in the shanks of the structure extending between the handles and the faces of the door, that, becoming loose in service, extend outward in such a manner as to scratch or cut the fingers of the user. In any position of adjustment, all external joints in the structure are formed by surface-to-surface contacts between the parts, and there are no joints that may, by becoming wide through the wear of the parts, pinch the fingers of the user.

While in the foregoing specification and in the appended claims, I have referred to handles, it will be understood that I intend to cover knobs, particularly, although not exclusively, knobs that are molded from a resinous material, such as Bakelite. Other modifications may be embodied in the structure without departing from the essence of the invention defined in the claims.

I claim as my invention:

1. An adjustable door handle assembly for mounting in a lock having a tubular lock element, including four separate members, viz. two handles each having an axial cylindrical portion and an integral stem portion adapted to extend with its end within the bore of the said lock element, and two collars adapted to be slidably mounted on the said cylindrical handle portions and having inward projections, the cylindrical handle portions being provided with longitudinal grooves in which the said projections may engage when the collars are in a certain angular position.

2. A handle structure for a door-latch comprising a stem equipped at one end with a handle and adapted at the opposite end to cooperate with said door-latch, and a collar on said stem adapted to be secured in fixed axial position relatively to the door-latch, said collar including a projection adapted in such assembly normally to abut upon the body of said handle and prevent axial movement of the stem in at least one direction, and said body of the handle including a recess normally spaced angularly from such projection on the collar and adapted, when (in making installation) the collar is rotated relatively to the handle, to receive said projection and permit relative axial movement of the parts, substantially as described.

3. A handle structure for a door-latch comprising a stem equipped at one end with a handle and a cylindrical portion, and adapted at opposite end to cooperate with said door-latch, a collar on said stem adapted to be secured in fixed axial position relatively to the door-latch, said collar including a projection adapted in such assembly normally to abut endwise upon said cylindrical portion and prevent axial movement of said stem in at least one direction, said cylindrical portion including an axially extending groove normally spaced angularly from such projection on the collar and adapted, when (in making installation) the collar is rotated relatively to the cylindrical portion, to receive said projection and permit relative axial movement of the parts, substantially as described.

4. A handle structure for a door-latch comprising a pair of stems secured in axial alignment end to end in an adjustable union and severally carrying handles at their outer ends, at least one of said stems being provided with a collar adapted to be secured in fixed axial position relatively to the door-latch, said collar including a projection adapted normally to abut upon the body of said handle and prevent axial movement of the assembled stems in the door-latch, as described, and said body of the handle including a recess normally spaced angularly from said projection on the collar and adapted, when (in making installation) the collar is rotated relatively to the handle assembly, to receive said projection and permit relative axial movement of the parts.

5. A handle structure for a door-latch comprising a pair of stems secured in axial alignment end to end in an adjustable union and each equipped at its outer end with a handle and a cylindrical portion, at least one of said stems being provided with a collar adapted to be secured in fixed axial position relatively to the door-latch, said collar including a projection adapted to abut endwise upon said cylindrical portion carried by such stem and prevent axial movement of the assembled stems in at least one direction, said cylindrical portion including a recess normally spaced angularly from such projection on the collar and adapted, when (in making installation) the collar is rotated relatively to the cylindrical portion, to receive said projection and permit relative axial movement of the parts, substantially as described.

CARL CHRISTIAN GRAVESEN.